Oct. 13, 1970 G. S. STEVENS, JR., ET AL 3,533,576
TAPE HANDLING APPARATUS
Filed March 25, 1969 3 Sheets-Sheet 1

INVENTORS
Raymond G. Boland
Gerald S. Stevens, Jr.
BY, Richard H. Smith
ATTORNEY Oct. 13, 1970 G. S. STEVENS, JR., ET AL 3,533,576

TAPE HANDLING APPARATUS

Filed March 25, 1969 3 Sheets-Sheet 2

United States Patent Office 3,533,576

Patented Oct. 13, 1970

3,533,576

TAPE HANDLING APPARATUS

Gerald S. Stevens, Jr., Utica, and Raymond G. Poland, Holland Patent, N.Y., assignors to Mohawk Data Sciences Corporation, Herkimer, N.Y., a corporation of New York Filed Mar. 25, 1969, Ser. No. 810,273
Int. Cl. B65h *59/38, 63/02;* G03b *1/04*
U.S. Cl. 242—189 13 Claims

ABSTRACT OF THE DISCLOSURE

A magnetic tape transport system employs a continuously rotating friction roll as an assist to the pimary takeup reel drive source in order to impart added acceleration to the takeup reel during tape slewing operations. The friction roll is moved into and out of operable position under the control of a tape tension arm provided between the tape drive capstan and the takeup reel.

BACKGROUND OF THE INVENTION

This invention relates to tape handling apparatus and, particularly, to apparatus for handling magnetic tape in such applications as call for relatively low-performance, low-cost equipment. Heretofore it has been the practice to drive the takeup reel of a tape handler with a single drive source. This one source would thus be required to supply an amount of torque sufficient to properly accelerate the reel under the most demanding anticipated feed conditions. Since such conditions, for example a long tape slew, occur relatively infrequently in the course of normal operation, the result is that the system is provided with a high performance drive that is used most of the time at a low performance level. This, of course, has an undesirable effect on the cost-performance ratio of the system.

OBJECTS AND SUMMARY OF THE INVENTION

It is therefore an object of the present invention to provide an improved tape handling system having a relatively simple and low cost means for feeding and taking up tape under conditions of operation characterized by long periods of low level performance interrupted by occasional periods of high level performance.

Another object is to provide a tape handling apparatus having an improved cost-performance ratio.

In accordance with the invention a relatively low performance drive means is employed to takeup reel under normal feed conditions. A second relatively low cost drive source, normally employed to perform other drive functions in the apparatus, is coupled into the tape takeup drive in those situations where additional takeup torque is required. In the preferred embodiment hereinafter described, the tape feed capstan drive motor is employed as the source of supplementary drive torque and a simple mechanical coupling mechanism employing an assist roll, sometimes also referred to as a "scrub" roll, is utilized under control of a tape slack buffering arm to supply the extra torque when it is required. Therefore, occasional high torque requirements are met by combining, on a temporary basis, two drive sources already provided in the mechanism whereby the performance of the system is substantially improved through the addition of only a relatively simple torque coupling device.

These and other objects, features and advantages will be made apparent by the following detailed description of a preferred embodiment of the invention, the description being supplemented by drawings as follows:

DETAILED DESCRIPTION

Figure 1:
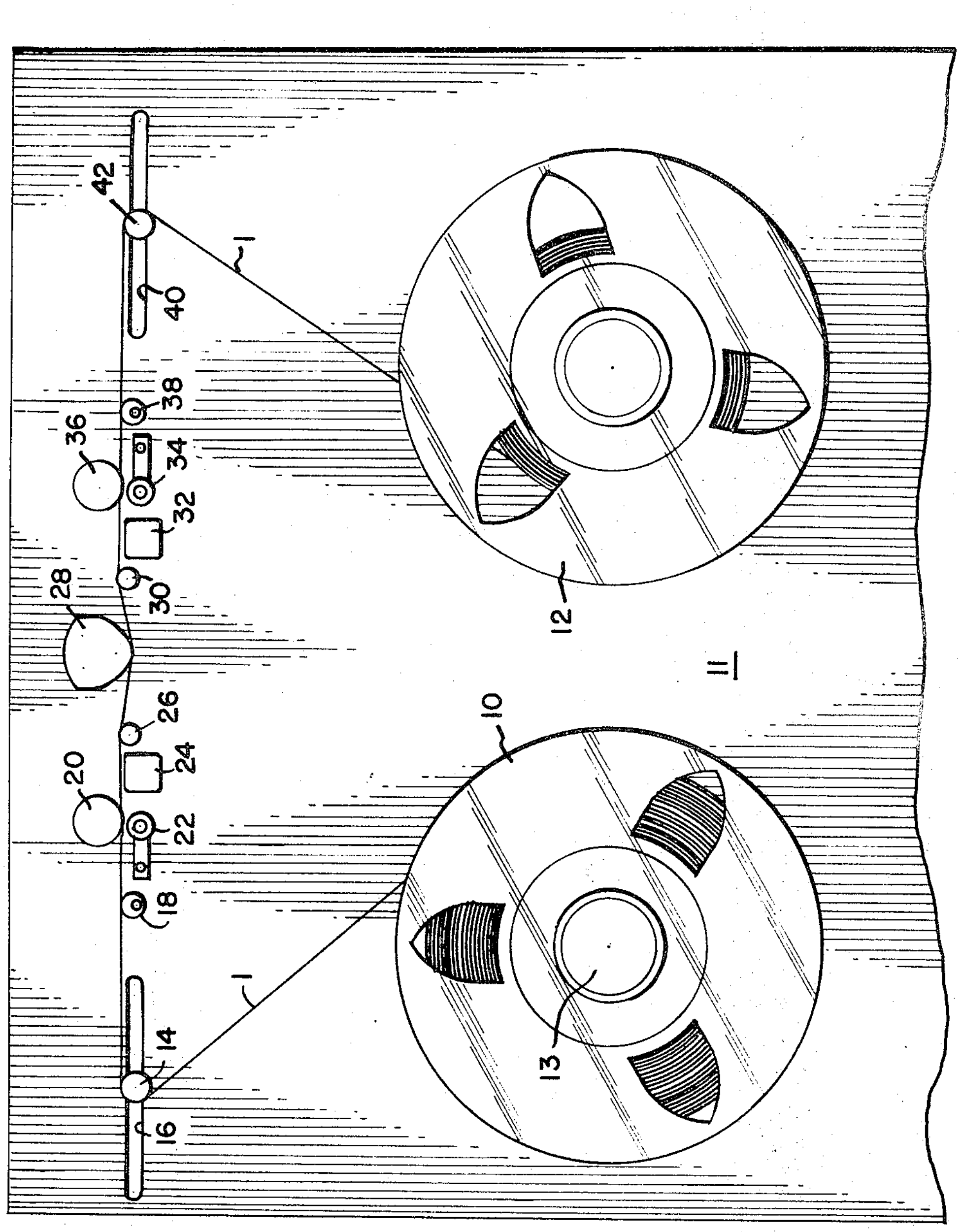
FIG. 1 is a front elevation view of a preferred form of tape handling apparatus in accordance with the invention.

Referring to FIG. 1, a preferred form of tape handler embodying the principles of the invention includes a supply reel 12 for supplying magnetic tape 1, a magnetic write-read head 28 under which the tape is fed and a takeup reel 10 mounted on a hub 13. The mechanism for feeding and guiding the tape under the head 28 includes a pair of laterally shiftable idler rolls 14 and 42, a pair of vertically adjustable tape guides 18 and 38, a pair of continuously rotating drive capstans 20 and 36, a pair of selectively operable pinch rolls 22 and 34, a pair of suction pads 24 and 32 and a pair of guides 26 and 30. The whole system is supported on a vertical frame plate 11.

Under normal conditions of operation, the tape is fed in a forward direction from right to left under head 28 in a start-stop mode wherein each length of forward feed is approximately one inch. The tape is intermittently backspaced to enable check reading of the data on the tape. When being fed the tape travels at approximately 30 inches per second.

Idler rolls 14 and 42 are mounted on spring biased dancer arms, provided on the opposite side of frame 11, and operate to buffer the tape slack between head 28 and the reels 10 and 12. Under the normal conditions of start-stop and intermittent back-space feeding, the lateral shifting of the rolls 14 and 42 is adequate to maintain proper tape tension while absorbing the changes in tape slack. The response of the reels need not be too rapid since during the intermittent periods when the tape is stopped the reels can "catch up." However, when a long tape slew, i.e., continuous feeding in excess of approximately 6 inches, is initiated, the reels, particularly takeup reel 10, must keep up with the tape feed rate in order to prevent the accumulation of too much slack in the tape. If takeup reel 10 is not accelerated by its drive source at a sufficient rate an amount of tape slack greater than can be handled by the leftward movement of roll 14 will accumulate, creating the danger that the tape might come off the roll 14 or the guide 18. It is thus highly important that the takeup reel drive system be able to supply a sufficient amount of torque under slew conditions to prevent such an occurrence.

Figure 2:
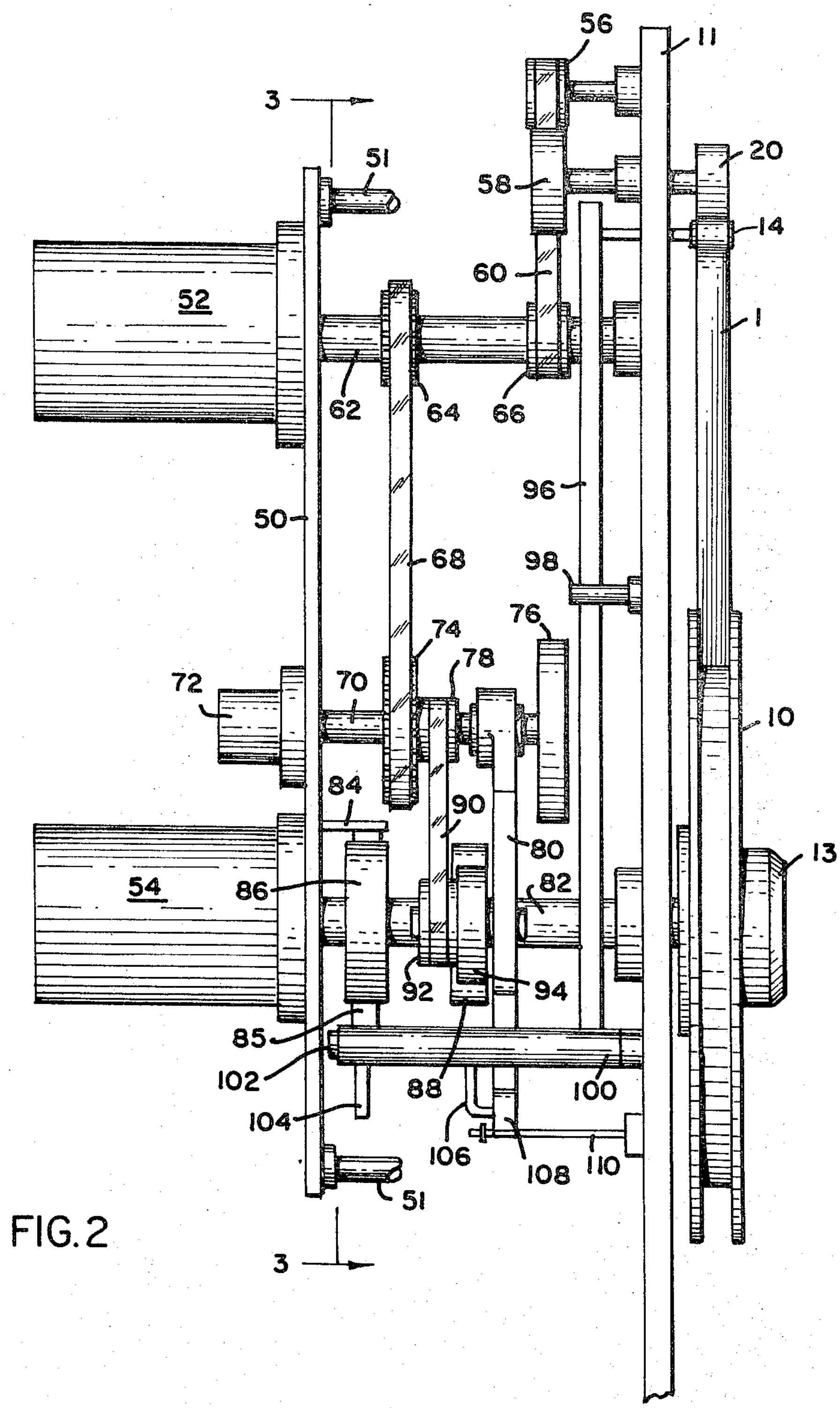
FIG. 2 is a left side elevation of the apparatus of FIG. 1 showing the details of the takeup reel drive mechanism.
Figure 3:
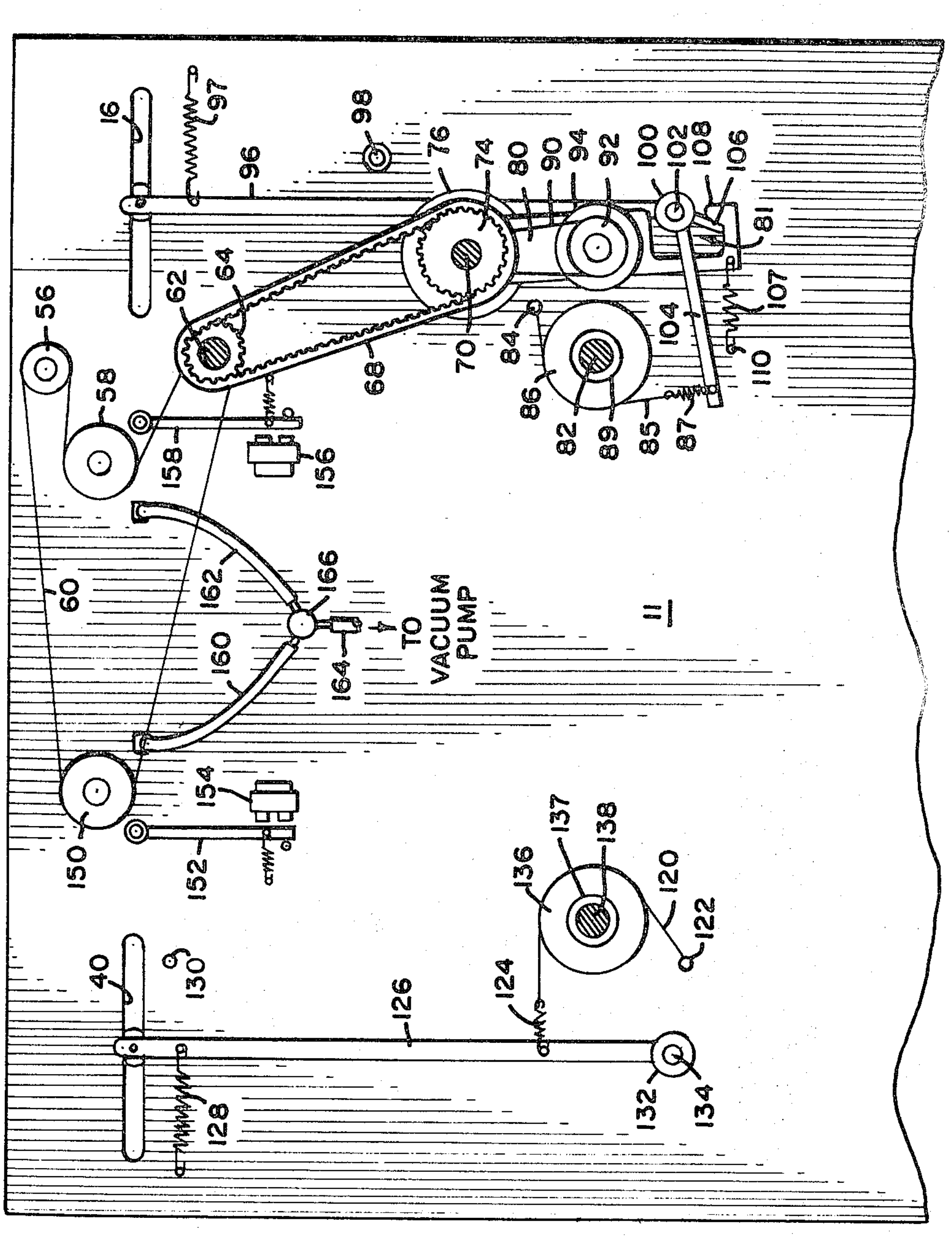
FIG. 3 is a rear elevation view of the apparatus of FIG. 1 showing further details of the takeup reel drive mechanism and also showing the details of the tape feed control and the supply reel control mechanisms.

FIGS. 2 and 3 show the mechanism employed for controlling the system. A motor 52 (FIG. 2) continuously rotates the tape feed capstans in opposite directions. The motor is mounted on a support plate 50 which is affixed to main frame 11 by a set of supports 51. The output shaft 62 from motor 52 extends the full distance between the plates 50 and 11 and is journaled at its far end in an end bearing affixed to plate 11. A pulley 66 mounted on shaft 62 drives a belt 60, which is entrained over the pulley 66, and over a pair of capstan drive rolls 58 and 150 and an idler pulley 56. Motor 52 drives shaft 62 clockwise (as seen in FIG. 3) so that roll 150 is driven clockwise and roll 58 counterclockwise. This imparts constant clockwise (as seen in FIG. 1) rotation to the forward feed capstan 20 and counterclockwise rotation to the reverse feed capstan 36.

The pinch roll 22, which cooperates with capstan 20 to feed the tape in the forward direction, is controlled by a solenoid 156 (FIG. 3) and a spring biased control arm 158. When the system control circuits (not shown) operate to energize solenoid 156, arm 158 is pivoted clockwise to cause pinch roll 22 to force and hold the tape against capstan 20. In like manner, solenoid 154 operates the arm 152 to force and hold the tape against capstan 36 to feed the tape in the reverse direction. Obviously, the operation of the solenoids 154 and 156 must be mutually exclusive.

A set of pressure tubes 160, 162 and 164, which are interconnected by a member 166, connect a vacuum source (not shown) to the suction pads 24 and 32 (FIG. 1). Pads 24 and 32 exert a constant drag on the tape to prevent overshoot. The vacuum is supplied throughout all phases of operation of the apparatus except during tape rewind.

The supply reel 12 is controlled during normal operation by a simple braking mechanism including a dancer arm 126 (FIGS. 2 and 3), a brake band 120 and a brake roll 136, the latter of which is mounted on a shaft 138 which supports the supply reel 12. An axle on the upper end of arm 126 projects through a slot 40 in frame 11 and supports the idler roll 42.

Arm 126 is mounted on a sleeve 132 which is rotatable about a pin 134 fixed to the back of frame member 11. Arm 126 is biased leftwardly by a tension spring 128. The brake band 120 is connected at one end to a stationary mounting stud 122 and is connected at its other end via a tension spring 124 to the arm 126. Band 120 is wrapped about brake roll 136 so that when arm 126 is allowed to pivot to the left under the bias of spring 128, brake band 120 is drawn into braking engagement with roll 136. The latter is mounted on shaft 138 by a unidirectional bushing 137 which locks the roll 136 to the shaft 138 when the latter rotates or attempts to rotate counterclockwise. Roll 136 idles on shaft 138 when the latter rotates clockwise.

Thus, when the forward feed capstan operates to pull tape off of the supply reel 12 arm 126 rocks to the right and releases the brake pressure on roll 136. This permits the tape tension to rotate the reel and its mounting shaft 138 counterclockwise (as seen in FIG. 3), relieving the tension on the tape and allowing arm 126 to pivot back to the left under the influence of spring 128. This increases the braking pressure exerted on roll 136 and the rotation of the reel is arrested. The spring 124 permits spring 128 to move arm 126 leftwardly beyond the braking position shown in FIG. 3 to allow arm 126 to take up the slack created by a tape backspacing operation. The net result is that the tape tension between the drive capstan 20 and the supply reel is kept relatively constant under the control of spring 128.

Shaft 138 is connected to a rewind motor (not shown) which is turned off during normal operation. To rewind the tape from reel 10 to reel 12 the suction is removed from pads 24 and 32 (FIG. 1) and the takeup reel drive (to be described subsequently) is turned off. The rewind motor drives shaft 138 clockwise (as seen in FIG. 3). The position of arm 126 is irrelevant to the rewind operation since the effect of brake band 120 is nullified by the unidirectional bushing 137. A stop 130 is provided, however, to limit the rightward movement of arm 126 produced by the relatively high tape tensions present during the initial stages of rewind.

As previously mentioned, the takeup reel hub 13 is connected to takeup shaft 82. The latter is subjected to a constant counterclockwise torque supplied by a takeup motor 54 mounted on a plate 50. Motor 54 is of the stall torque or slip drive type to permit braking of shaft 82 without adverse effects on the motor. Idler roll 14 is mounted at the upper end of a dancer arm 96 on an axle extending through slot 16. Arm 96 is connected to a sleeve 100 freely rotatable about a pin 102 connected to frame 11 and is biased to the right by a tension spring 97. A brake roll 86 is mounted on shaft 82 by a unidirectional bushing 89 similar to the bushing 137. Bushing 89 locks roll 86 to shaft 82 when the latter is turning, or attempting to turn, counterclockwise. Shaft 82 is permitted to turn clockwise free of the roll 86. Also affixed to sleeve 100 is an arm 104 which is connected at its outer end to a brake band 85. The latter is fixed at one end to a stationary mounting stud 84 and is connected at its other end to a tension spring 87 which is hooked to the arm 104.

Thus, arm 96 and brake band 85 provide a control for the takeup mechanism similar to that provided to the supply mechanism by arm 126 and band 120. As the forward drive capstan starts to feed tape to the takeup reel, spring 97 pulls arm 96 to the right, reducing the braking pressure exerted on roll 86 by band 85. This permits the counterclockwise torque from motor 54 to rotate the shaft 82 and the roll 86, turning the takeup reel to wind tape. The effect of this is to pull arm 96 back to the left whereupon the braking pressure is increased and the takeup reel is arrested. The net result is that the tape tension between the forward drive capstan and the takeup reel is kept relatively constant under the control of spring 97.

For purposes of economy it is desirable that the takeup motor 54 be of the low torque, low cost type. This means that the counterclockwise acceleration, the windup response, of reel 10 is not rapid. This, however, is not a drawback during normal start-stop operation since the rightward movement of arm 96 is sufficient to buffer the increased tape slack experienced at the beginning of a forward feed cycle. As long as the takeup reel can be driven in time to reduce this slack back to normal before the next forward feed cycle begins the tape slack cannot get out of hand. However, when tape slewing occurs a problem is created since if the takeup reel drive does not respond sufficiently by the time arm 96 hits the rightward limit stop 98, excess slack will accrue and the tape can come off the idler roll 14.

Therefore, to solve this problem without changing the response characteristics of motor 54, the system is provided with a "scrub" or assist roll 94 which is brought into operation to couple added windup torque to the shaft 82 when necessary. Roll 94 is rotatably supported on an axle 81 mounted on a swinging arm 80. Arm 80 is piovtable about a rotatable shaft 70 which is journaled in an end bearing 72 mounted on plate 50.

Assist roll 94 is continuously rotated in the clockwise direction (as seen in FIG. 3) by the capstan drive motor 52. This is effected by a drive train including a timing gear 64 connected to shaft 62, a timing gear 74 and interconnected pulley 78 and a pulley 92 connected to the assist roll. Timing gears 64 and 74 are coupled by a timing belt 68 and pulleys 78 and 92 are coupled by a belt 90.

The arm 80 moves roll 94 into and out of engagement with a drive roll 88 (FIG. 2), mounted on shaft 82, under the control of a spring 107 and the dancer arm 96. Spring 107 biases arm 80 toward shaft 82. A camming arm 106 affixed to sleeve 100 pivots in unison with arm 96. An L-shaped appendage 81 extending from the bottom of arm 80 has an upwardly-projecting end portion 108 which cooperates with the camming arm 106. Thus, when arm 96 pivots to the right arm 106 permits arm 80 to be pulled to the left by spring 107. A few degrees of leftward movement of arm 80 places assist roll 94 into engagement with drive roll 88, whereupon the clockwise rotation of the roll 94 assists the counterclockwise takeup rotation of shaft 82. This is because the peripheral velocity of roll 94 is appreciably greater than that of roll 88 and the friction coupling therebetween imparts a sudden burst of acceleration to the takeup reel. Of course, as soon as this happens the tape tension pulls arm 96 back to the left and assist roll 94 becomes disengaged from roll 88. Thus, prolonged engagement between rolls 94 and 88 is avoided. This factor, along with the effect of flywheel 76 on shaft 70 plus the gear reduction provided by the drive train 64, 74, 78, 92 substantially eliminates any adverse velocity variations at the tape drive capstans due to the operation of the assist roll.

The roll 88 is mounted on shaft 82 by a unidirectional bushing which locks the roll 88 to the shaft 82 when the former attempts to rotate counterclockwise (as seen in FIG. 3) with respect to the latter. Thus, while roll 94 can increase the counterclockwise velocity of shaft 82, it cannot limit it.

To review the operation of the overall system, actuation of solenoid 156 causes capstan 20 and pinch roll 22 to feed the tape in a right-to-left direction (as seen in FIG. 1) whereupon idler roll 42 and arm 126 are pulled to the right (as seen in FIG. 3) releasing the supply reel to give up tape. At the same time spring 97 pivots arms 96 and 104 clockwise, releasing brake roll 86 to allow the counterclockwise torque from the takeup motor to drive the takeup reel. As soon as the forward feed movement stops, the reduced tape tension on the supply side allows spring 128 to pull arm 126 to the left, braking the supply reel. At the same time, the increased tape tension on the takeup side pivots arms 96 and 104 counterclockwise to brake the takeup reel against the torque from motor 54. In the event the forward feed motion is not stopped shortly after it is started, the lack of a rapid response by takeup motor 54 permits spring 97 to pivot arm 96, along with arm 106, through a larger clockwise angle than usual, whereupon the arm 80 pivots the assist roll 94 into engagement with drive roll 88, imparting additional takeup acceleration to shaft 82 to prevent a runaway of the takeup slack.

It will be appreciated that various changes in the form and details of the above described preferred embodiment may be effected by persons of ordinary skill without departing from the true spirit and scope of the invention.

What is claimed is:

1. In a tape handling system, the combination comprising:

- a tape supply source;
- takeup means for winding up tape feed from said source;
- first means supplying takeup torque to drive said takeup means;
- means for braking said takeup means against said torque;
- slack means responsive to the length of tape between said source and said takeup means;
- first control means connected to said slack means for controlling said braking means, whereby the latter is operated to arrest said takeup means when said tape length reaches a predetermined minimum;
- assist means for supplying takeup torque to said takeup means; and
- second control means connected to said slack means for controlling said assist means, whereby the latter is operated to supply takeup torque when said tape length reaches a predetermined maximum.

2. In a tape handling system means for taking up tape fed from a supply source comprising in combination:

- tape winding means including a drive shaft and a reel mounted on said shaft;
- first and second means for supplying drive torque to said shaft;
- means for buffering varying amounts of slack tape between said source and said reel; and
- control means responsive to the amount of tape in said buffering means for rendering both said first and second torque supply means ineffective to drive said shaft when said buffering means conains a first predetermined amount of tape.

3. The tape handling system set forth in claim 2 wherein said control means is further operable to render said first torque supply means, only, effective to drive said shaft when said buffering means contains a second predetermined amount of tape.

4. The tape handling system set forth in claim 3 wherein said control means is further operable to render both said first and second torque supply means effective to drive said shaft when said buffering means contains a third predetermined amount of tape.

5. The tape handling system set forth in claim 2 wherein said buffering means comprises:

- a tape engaging idler roll positioned between said source and said reel; and
- a spring-biased pivot arm supporting roll and constructed and arranged to indicate, by its angular position, the amount of tape between said source and said reel.

6. The tape handling system set forth in claim 5 wherein said first and second torque supply means comprise, respectively:

- a first motor connected to said shaft;
- a friction drive roll positioned adjacent said shaft and movable into and out of engagement therewith; and
- a second motor connected to drive said roll.

7. The tape handling system set forth in claim 6 wherein said control means comprises:

- a brake band connected to said pivot arm and engageable with said brake roll to arrest said shaft when said pivot arm is in a first angular position indicating the presence of a first predetermined amount of tape in said buffering means; and
- camming means responsive to the position of said pivot arm and constructed and arranged to hold said drive roll out of engagement with said shaft when said pivot arm is in said first position.

8. The tape handling system set forth in claim 7 wherein said control means is further constructed and arranged to hold said drive roll out of engagement with said shaft and to cause said brake band to release said shaft when said pivot arm moves to a second angular position.

9. The tape handling system set forth in claim 8 wherein said control means if further constructed and arranged to hold said brake band released from said shaft and to shift said drive roll into engagement with said shaft when said pivot arm moves to a third angular position.

10. In a tape handling system the combination comprising:

- a tape supply source;
- transport means, including constant speed drive means, for feeding tape from said source;
- tape winding means including a drive shaft and a reel mounted on said shaft;
- control means for buffering varying amounts of slack tape between said transport means and said reel;
- a friction drive roll connected to be continuously rotated by said drive means;
- mounting means for movably mounting said drive roll adjacent said drive shaft; and
- linkage means connecting said control means and said mounting means whereby said drive roll is moved into and out of engagement with said drive shaft to control the operation of said reel in accordance with the amount of slack tape between said transport means and said reel.

11. The tape handling system set forth in claim 10 wherein said control means comprises:

- a pivotable, spring-biased dancer arm; and
- a tape-engaging roller mounted on said arm and engaging said tape at a point between said transport means and said reel whereby said arm maintains said slack tape under tension.

12. The tape handling system set forth in claim 11 wherein said linkage means comprises:

- a cam arm connected to said dancer arm and constructed and arranged to engage said mounting means whereby said friction drive roll moves into and out of engagement with said shaft in accordance with the movement of said dancer arm.

13. The tape handling system set forth in claim 12 wherein said linkage means further comprises:

lost motion means to permit continued movement of said dancer arm in a first direction after movement of said arm in said direction has caused said friction drive roll to engage said drive shaft.

References Cited

UNITED STATES PATENTS

| | | | |
|---|---|---|---|
| 2,580,717 | 1/1959 | Ballou | 242—75.5 X |
| 2,711,104 | 7/1955 | Shields | 74—472 |
| 2,725,200 | 11/1955 | Ward | 242—189 |
| 2,745,604 | 5/1956 | Masterson | 242—189 |
| 2,969,200 | 1/1961 | Selsted | 242—189 |
| 3,072,352 | 1/1963 | Loewe | 242—202 |
| 3,232,546 | 2/1966 | Ferrand et al. | 242—189 |

LEONARD D. CHRISTIAN, Primary Examiner

U.S. Cl. X.R.

242—75.5, 203